June 6, 1939.　　　　　H. BECKER　　　　　2,160,818
TRANSMISSION MECHANISM FOR PHOTOGRAPHIC CAMERAS
Filed March 25, 1937　　　2 Sheets-Sheet 1

INVENTOR
Helmut Becker
BY
Ivan E. A. Konigsberg
ATTORNEY

June 6, 1939.  H. BECKER  2,160,818
TRANSMISSION MECHANISM FOR PHOTOGRAPHIC CAMERAS
Filed March 25, 1937  2 Sheets-Sheet 2

INVENTOR
Helmut Becker
BY
Ivan E. A. Konigsberg
ATTORNEY

Patented June 6, 1939

2,160,818

UNITED STATES PATENT OFFICE 2,160,818

TRANSMISSION MECHANISM FOR PHOTOGRAPHIC CAMERAS

Helmut Becker, Wetzlar, Germany, assignor to Ernst Leitz, G. m. b. H., Wetzlar, Germany Application March 25, 1937, Serial No. 132,897
In Germany April 3, 1936

5 Claims. (Cl. 95—31)

This invention relates to improvements in motor driven roll film cameras and has particular reference to improvements in the transmission mechanism between the motor and the camera. Such transmission mechanism has two periods of operation. While the exposure is being made the transmission idles. While the shutter mechanism and the film winding means are being rewound for the next exposure the transmission connects these mechanisms to the motor and is then running actively. The object of the invention is to improve generally the transmission mechanism whereby to effect a saving in power expended by the motor. The invention is embodied in a spring motor and transmission gearing attached to a camera and so arranged that the periods of active operation of the transmission mechanism is longer than the period of relative idleness. Accordingly the invention is embodied in a spring motor and gear transmission for a roll film camera arranged and constructed as hereinafter set forth and as illustrated in the accompanying drawings in which Fig. 1 is a front view of a roll film camera with spring motor attached, parts being in section and parts removed and broken away.

Figure 1:
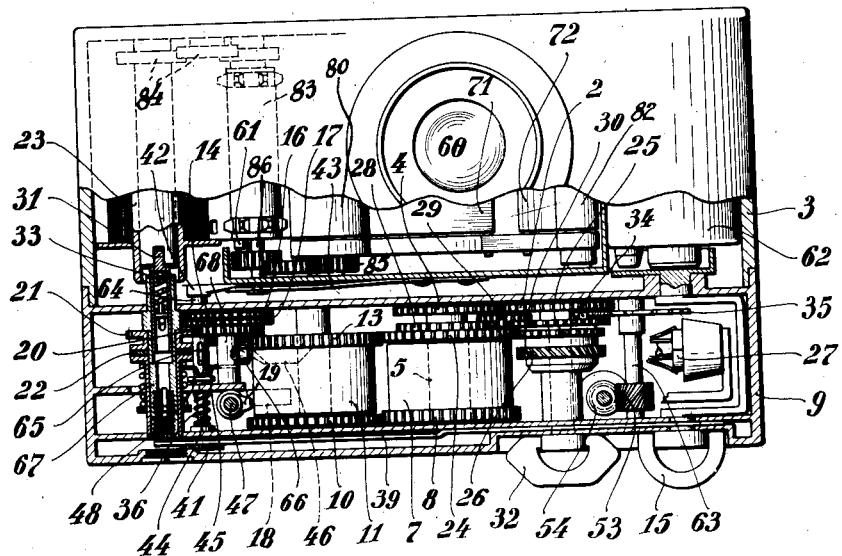

The camera is provided with a focal plane shutter of the type disclosed in U. S. Patent 1,652,553, Dec. 13, 1927, and which is well known in the art. The shutter includes two curtains or blinds 71 and 72. When the shutter is closed the curtain 71 is wound upon a curtain roller 80 and the curtain 72 is stretched across the exposure opening between the roller 80 and the usual curtain spring rollers 82. There are two rollers 82 one behind the other and one for each curtain. The film is contained within a casette 62 and is unwound therefrom and wound up upon a film spool 23 by means of a film transport roller 83 which is geared at the top by gearing 84 to the spool 23. At the bottom the transport roller is geared by gearing at 85 to the curtain roller 80. The numeral 61 indicates a depressible release member. As is well known, such member is at the bottom of a release rod which extends through the top of the camera for operation by the photographer.

In normal position a flat spring 43 engages a coupling member 86 whereby the curtain roller gearing 85 is prevented from rotating being then coupled to the film transport roller. When an exposure is to be made the release 61 is depressed against the spring 43 to uncouple the gearing 85 which is now free to rotate. The shutter is now opened by the action of the spring rollers 82 which pulls the curtain across the exposure opening with a slit between them as is shown in Fig. 1.

The shutter is rewound after exposure by the film spool 23. The latter is rotated by means hereinafter explained and in turn, through the gearing 84, roller 83 and gearing 85, rotates the curtain roller to rewind the shutter, the release of course then having been moved back into normal position by the spring 43. All of the foregoing is well known in the art and covers the operation when the release 61 is manually operated. In the present instance means are provided for automatic operation of the shutter release and shutter rewind as will appear hereinafter.

A motor is attached to a camera for the purpose of enabling the operator to take a series of pictures without having to wait between exposures in order to rewind the shutter and film mechanisms. In the present instance the motor mechanism is contained within a casing 9 attached to the camera by any suitable means. The motor mechanism comprises a winding up shaft 1 which carries a gear 2 in mesh with another gear 4 fast on a shaft 5. A motor spring 6 is secured to the shaft 5 within the drum 7. The latter carries a gear 8 which meshes with a gear 10 carried by another drum 11, which contains a second spring 12. The drum 11 carries still another gear 13. The shaft 1 has a handle 32 for rotating the shaft to wind up the motor springs through the aforesaid train of gears.

The housing or drum 11 is provided with a cam 18 which is engaged by a nose 19 on a horizontal shaft 47 to prevent rotation of the motor 6—12. The nose 19 is slidably carried by the shaft 47 by means of a pin and slot connection 49—50.

A spring 51 serves to cushion the blow or engagement between the cam 18 and the nose 19 as will be understood. The shaft 47 is rotated to release the spring motor by means of a lever 52 on the outside of the housing 9.

Figure 2:
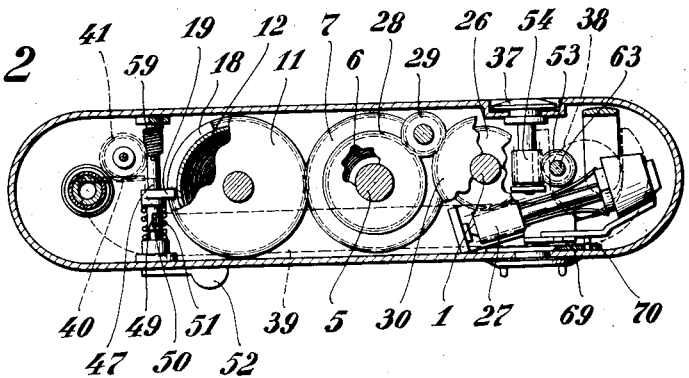
Fig. 2 is a plan view of the spring motor mechanism with parts broken away or shown in section and other parts omitted for the sake of clearness.

The gear 13 on the drum 11 meshes with a double gear 24—28 on the drum shaft 5. The lower gear 24 drives a gear 25 connected to another gear 26. The latter operates a governor 27 in a well known manner, see Fig. 2. The gear 28 which is above the gear 24 drives a suitably supported pinion 29. The latter in turn drives a gear 30 which carries a pin 34 in engagement with a Geneva shop 35 on the shaft 63. A gear 53 on the latter drives a gear 54 which rotates a counter dial 37, Fig. 2.

Referring now to the mechanisms within the camera it has already been explained that the shutter which is indicated in Fig. 1 by the usual two shutter curtains 71 and 72 is released to make an exposure when the shutter release 61 is depressed against the spring 43 which normally prevents operation of the release. In the ordinary operation of the camera the shutter release is depressed by the operator whereby the spring 43 is moved down and no longer prevents operation of the release. In the present instance means are provided for moving the spring 43 down automatically when the motor is released to start operations. For this purpose there is provided an arm 42 which is adapted to be moved in over the spring 43 when the housing 9 is attached to the camera. The arm is carried by the upper end of a sleeve 64 which is slidably and rotatably connected to a shaft 44 by a pin and slot connection at 65. The sleeve carries a disk 48 which supports a lever 45 having a cam roll 66 adapted to be engaged by a cam 46 on the spring drum 11. A spring 36 keeps the sleeve 64 and the roll 66 in normal upper position. The shaft 44 carries a gear 41 which is engaged by a rack 40 upon the end of a long slide 39. The latter is shifted by an eccentric 38 operated by the handle 15. When the housing 9 is attached to the camera, the handle 15 is rotated to lock the two housings together and to open the casette 62. Rotation of the handle 15 causes rotation of the eccentric 38 whereby the slide 39 is shifted so that the rack 40 may rotate the gear 41 to swing the arm 42 in over the spring 43. When the motor is released the drum 11 starts to rotate. The cam 46 then engages the roll 66 to depress the lever 45 with the sleeve 64 and the arm 42. The latter moves the spring 43 down, the shutter release is now free and the shutter operates. The film in the camera is wound from the casette 62 to the spool 23. The spool is operated by means of a pin 31 which in a known manner yieldingly engages the spool to rotate the same. A spring 33 is provided to force the pin 31 into engagement with the spool when the parts are in registering positions as will be understood. The shaft 67 for rotating the pin and the spool is in turn rotated by means of a friction disk 22 which is engaged by a gear 21. Whenever the gear 21 is actuated, it rotates the shaft 67 and the pin 31 to operate the spool to wind up the film and the shutter.

Figure 3:
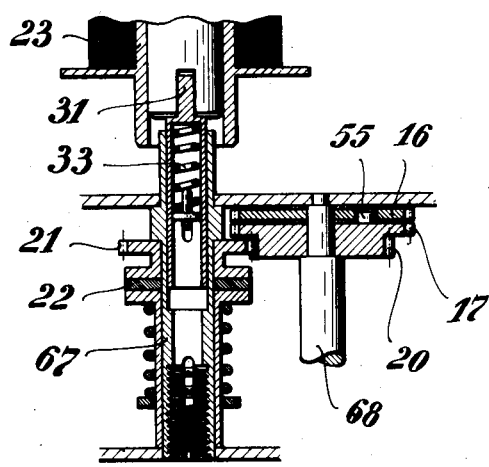
Fig. 3 is an enlarged detail side view of parts of the transmission mechanism and parts of the camera mechanism.

The improved transmission mechanism which forms the subject matter of this application is interposed between the gear 13 on the drum 11 and the aforesaid gear 21. The transmission is arranged to drive the gear 21 between exposures and to run idle during exposures. It comprises the following elements, see Figs. 3 and 4.

Figure 4:
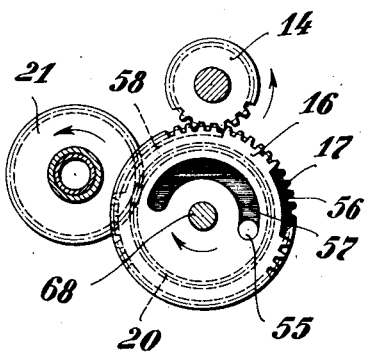
Fig. 4 is a plan view of some of the gears in the transmission.

The numeral 68 denotes a shaft which carries a double gear 20—17. The gear 20 meshes with the aforesaid gear 21. The gear 17 is driven from the motor gear 13 by means of a pinion 14 suitably supported. Upon the shaft 68 and above the gear 17 there is another gear 16 which also meshes with the pinion 14. The gear 16 has a circular slot 57 which is engaged by a pin 55 fast in the gear 17 below. As seen in Fig. 4, the teeth on the upper gear 16 are removed for a certain distance as at 56. The teeth on the lower gear 17 are likewise removed for a certain greater distance as at 58 so that in Fig. 4, the gear 17 is not in mesh with the pinion 14. Broadly speaking the operation of the transmission gears is as follows. Gears 16 and 17 are driven by the pinion 14. This driving operation is interrupted whenever the smooth portions 56 and 58 come opposite the pinion 14, at which time the two gears are individually transported past the pinion 14 by the pin and slot 55—57. When the gear 17 is rotating it drives the gear 21 via the gear 20 and then the film and shutter mechanisms are operated. When the gear 17 stands still these mechanisms are not operated because then an exposure is being made.

The operation is as follows: The motor is wound up by rotating the shaft 1 and when the winding up operation is finished, the motor is held in wound up position by the cam 18 abutting the nose 19. During the winding up the gear 30 and pin 34 rotate the Geneva stop 35 which in turn operates the counter dial 37 to indicate the number of exposures desired. When the operator desires to take pictures he depresses the lever 52 releasing the motor. As the latter now starts to operate the cam 18 on the drum 11 engages the roller 66 to depress the shaft 44 and the arm 42. Thus the camera spring is depressed and the shutter is released. The depression of the roller 66 occurs for only a period measured by the length of the cam. During this period the gear 16 is rotated by the pinion 14, but the gear 17 is not rotated so that while the shutter is operated the gear 17 stands still and does not drive the gear 21 and the shutter rewind and the film rewind are not operated. When, however, through the operation of the pin 55 and the slot 57 the gear 17 is again rotated, which will happen after the exposure, the gears 20 and 21 are driven to operate the pin 31 which in turn operates the film spool 23 to rewind the film and rewind the shutter.

Figure 5:
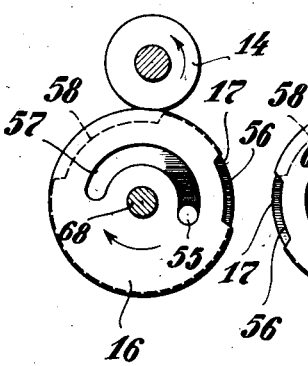
Figs. 5 to 8 are diagrams illustrating the operation of the transmission mechanism.
Figure 6:
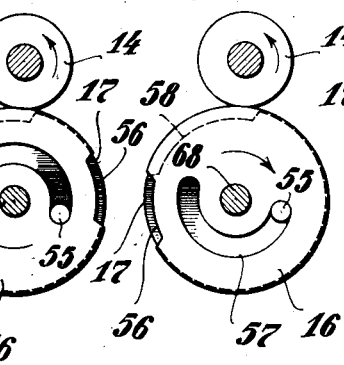
Figure 7:
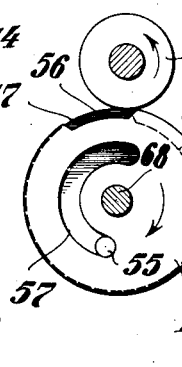
Figure 8:
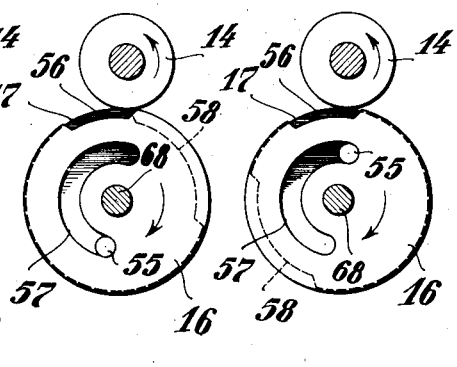

The operation of the transmission gears 17 and 16 is specifically as follows, see Figs. 5, 8. For the sake of clearness these figures do not show gear teeth. The two gears 17 and 16 are of the same diameter but in order to understand the operation the circle which indicates the gear 17 is drawn slightly inside the circle which indicates the gear 16 which is on top. First it will be noticed that in Figure 5 the gear 16 is in mesh with pinion 14 while the gear 17 is not in mesh because the toothless portion 58 is opposite the pinion. Consequently when the pinion starts to rotate only the gear 16 is driven and the slot 57 then moves idly on the pin 55, the gear 17 standing still until the end of the slot reaches the pin as in Figure 6. Now the slot 57 continuing its movement carries the pin 55 and the gear 17 along until the position is reached in Fig. 7. At this time the toothless portions 56 in gear 16 is opposite the pinion 14 so gear 16 stops. However at this time the teeth on gear 17 have reached the pinion 14. The gear 17 is now rotated and the pin 55 moves idly in the slot 57 until the position in Fig. 8. From here on the pin 55 takes the slot along and rotates gear 16 into mesh with the pinion 14, the toothless portion 56 being moved past the pinion. The movement of the gear 17 stops when the parts again reach the position in Figure 5. From this it will be seen that while the gear 16 makes half a revolution from Fig. 5 to Fig. 6 and the gear 17 stands still the pinion 14 makes a complete revolution which represents idling on the part of the motor with respect to performing any operations within the camera, this being the exposure period. Thereafter the gear 17 makes a complete revolution. First from Fig. 6 to Fig. 7 by way of the pin and slot connection and then back to Fig. 5 by means of the pinion 14 which thus makes two complete revolutions which represents work by the motor which is used to rewind the shutter and wind up the film. It follows therefore that the work period of the motor with respect to operating the camera is longer than the idle period, hence very little power is lost. The length of the slot 57 determines the period of idleness. The power expended by the motor during this period is lost so far as the shutter and film rewinding is concerned which is the reason for making the period of idleness materially shorter than the work period.

The gears 17 and 20 move together to drive the smaller gear 21 which in turn by way of the friction disk 22 rotates the shaft 67 to wind up the film and the shutter. The operations are stopped by the operator letting go of the lever 52. The spring 59 then rotates the shaft 47 counter clockwise to bring the nose 19 into the path of the cam 18 to stop the motor, the stopping movement being cushioned by the spring 51. During the taking of the pictures the speed of the motor is regulated by the governor 27 and the exposures counted by means of the Geneva stop 35 and counter dial 37. The speed of the governor is regulated in a known manner by rotating a disk 69 which is connected to the governor by a pin 70. The friction disk is provided to serve as a safety element in case the camera is provided with a film rewinding mechanism not shown. In such event it may happen that the end of the film may be pulled away from the rewinding spool or the perforations torn. The friction disk prevents such happenings because the friction is weaker than the force necessary for tearing the film or pulling it away from the spool.

From the foregoing, it will be clear that the transmission device according to this invention is designed to utilize the power of the motor in such a manner that the period during which the motor is not directly coupled to the camera mechanisms is shorter than when it is so coupled. Or in other words the period during which the motor operates per se but is not doing any work are cut down, hence useless expenditure of power is avoided.

I claim:

1. In a motor driven roll film camera including a roll of film, mechanism for unwinding the film therefrom to expose the same, a shutter and mechanisms for opening the shutter to make an exposure and for rewinding the shutter to close the same, a motor attached to said camera for actuating all of said mechanisms, a power transmission device interposed between the motor and the said mechanisms for interruptedly transmitting power from the motor to the said mechanisms during a complete exposure operation and means in said transmission device for automatically interrupting the power transmitting operations thereof for a period of time which is shorter than the period of time during which power is transmitted by said device from the motor to the said camera mechanisms.

2. In a motor driven roll film camera including a roll of film, mechanism for unwinding the film therefrom to expose the same, a shutter and mechanisms for opening the shutter to make an exposure and for rewinding the shutter to close the same, a motor attached to the camera for actuating all of said mechanisms, a power transmitting device interposed between the motor and said mechanisms, said power transmitting device including a gear for interruptedly transmitting the power from the motor to the camera mechanisms, a second gear for interruptedly operatively connecting the first gear to the motor and means operatively connecting said gears to regulate the durations of the periods during which the said first gear is operatively connected to the motor.

3. In a motor driven roll film camera including a roll of film, mechanism for unwinding the film therefrom to expose the same, a shutter and mechanisms for opening the shutter to make an exposure and for rewinding the shutter to close the same, a motor attached to the camera for actuating all of said mechanisms, a power transmitting device interposed between the motor and said mechanisms, said power transmitting device including a gear for interruptedly transmitting the power from the motor to the camera mechanisms, a pin in said gear, a second gear having a slot engaging the said pin in the first gear for interruptedly operatively connecting the first gear to the motor for a period of time which is longer than the period during which the first gear is not connected to the motor.

4. In a motor driven roll film camera including a shutter release, a film winding spool and shutter rewinding means, a shutter release holding spring, a member for moving the same into shutter releasing position, a spring motor attached to said camera to actuate the shutter rewinding means and operate the said spool between exposures, a lever for operating the said member to move the said spring as aforesaid and means actuated by the motor when the latter is started for operating the said lever.

5. In a motor driven roll film camera including a film supporting spool mechanism for unwinding the film therefrom to expose the film, a shutter and devices for opening the shutter to make an exposure and for operating said spool to rewind the film and the shutter; a motor attached to the camera, a power transmitting device interposed between the motor and said mechanisms for interruptedly operating all of said mechanisms, a single shaft for operatively connecting the power transmitting device to the said film spool to actuate the film and shutter unwinding mechanisms and a friction drive between said shaft and the said power transmitting device, whereby to obtain a smooth and easy operation of said rewinding elements.

HELMUT BECKER.